(12) United States Patent
Bevan et al.

(10) Patent No.: US 10,053,103 B2
(45) Date of Patent: *Aug. 21, 2018

(54) ADAPTIVE POWERTRAIN CONTROL FOR OPTIMIZED PERFORMANCE

(71) Applicant: JAGUAR LAND ROVER LIMITED, Warwickshire (GB)

(72) Inventors: Neil Bevan, Coventry (GB); Robin Maugham, Coventry (GB); Andrew Lilley, Coventry (GB); Simon Jarvis, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 104 days.

This patent is subject to a terminal disclaimer.

(21) Appl. No.: 14/903,315

(22) PCT Filed: Jul. 3, 2014

(86) PCT No.: PCT/EP2014/064181
§ 371 (c)(1),
(2) Date: Jan. 7, 2016

(87) PCT Pub. No.: WO2015/003993
PCT Pub. Date: Jan. 15, 2015

(65) Prior Publication Data
US 2016/0144863 A1  May 26, 2016

(30) Foreign Application Priority Data

Jul. 8, 2013 (GB) .................................. 1312211.4

(51) Int. Cl.
*B60W 10/06* (2006.01)
*B60W 30/188* (2012.01)
(Continued)

(52) U.S. Cl.
CPC .......... *B60W 30/188* (2013.01); *B60W 10/06* (2013.01); *B60W 10/10* (2013.01);
(Continued)

(58) Field of Classification Search
CPC .. B60W 30/188; B60W 50/082; B60W 10/06; B60W 2050/0014; B60W 2600/00;
(Continued)

(56) References Cited

U.S. PATENT DOCUMENTS 5,941,918 A * 8/1999 Blosser ................... F01N 11/00
340/439
7,115,069 B2 * 10/2006 Soliman ................ F16H 61/061
477/143
(Continued)

FOREIGN PATENT DOCUMENTS

CN 103061909 4/2013
EP 1327759 A2 7/2003
(Continued)

OTHER PUBLICATIONS

International Search Report and Written Opinion of the International Searching Authority for International application No. PCT/EP2014/064181 dated Sep. 29, 2014.
(Continued)

*Primary Examiner* — Roger L Pang
(74) *Attorney, Agent, or Firm* — Carlson, Gaskey & Olds

(57) ABSTRACT

The invention relates to an adaptive powertrain control for realizing an enhanced or optimized performance of one or more vehicle features. By monitoring vehicle performance, dynamic adjustments can be made to various vehicle operation parameters to enhance a feature of vehicle performance, such as fuel economy. A method (40) of controlling a vehicle powertrain includes monitoring vehicle performance (42) and determining whether at least one of a plurality of vehicle
(Continued)

performance features may be enhanced (44). A plurality of operation parameters that are associated with the powertrain are identified that have a relationship to the at least one performance feature (46). An adjustment is automatically made to at least one of the identified operation parameters to thereby enhance at least one aspect of the at least one performance feature (48). The performance feature may comprise fuel economy or urea consumption.

21 Claims, 5 Drawing Sheets

(51) Int. Cl.
*F02D 13/02* (2006.01)
*F01N 3/20* (2006.01)
*F01N 9/00* (2006.01)
*B60W 10/10* (2012.01)
*B60W 50/08* (2012.01)
*F02D 41/00* (2006.01)
*B60W 50/00* (2006.01)
*F02D 41/14* (2006.01)

(52) U.S. Cl.
CPC ............ *B60W 50/082* (2013.01); *F01N 3/20* (2013.01); *F01N 3/208* (2013.01); *F01N 9/005* (2013.01); *F02D 13/02* (2013.01); B60W 30/1882 (2013.01); B60W 2050/0014 (2013.01); B60W 2050/0088 (2013.01); B60W 2530/12 (2013.01); B60W 2540/30 (2013.01); B60W 2600/00 (2013.01); B60Y 2300/472 (2013.01); B60Y 2300/476 (2013.01); B60Y 2400/432 (2013.01); B60Y 2400/442 (2013.01); F02D 41/005 (2013.01); F02D 41/1406 (2013.01); F02D 2041/1433 (2013.01); F02D 2200/606 (2013.01); F02D 2250/36 (2013.01); Y02A 50/2325 (2018.01); Y02T 10/18 (2013.01); Y02T 10/24 (2013.01); Y02T 10/47 (2013.01)

(58) Field of Classification Search
CPC ..... B60W 30/1882; B60W 2050/0088; B60W 2530/12; F01N 3/20; F01N 9/005; Y02T 10/24; Y02T 10/47; Y02T 10/18; B60Y 2400/442; B60Y 2400/432; B60Y 2300/472; B60Y 2300/476; F02D 2200/606; F02D 2250/36; F02D 41/1406; F02D 2041/1433; F02D 41/005; F02D 13/02
USPC ............................................. 701/99, 57, 106
See application file for complete search history.

(56) References Cited

U.S. PATENT DOCUMENTS

| | | | |
|---|---|---|---|
| 8,965,644 B2* | 2/2015 | Jeon | F16H 61/0213 |
| | | | 701/57 |
| 8,983,743 B2* | 3/2015 | Jeon | B60W 30/182 |
| | | | 701/57 |
| 9,200,583 B2* | 12/2015 | Jiang | F02D 13/0215 |
| 9,616,890 B2* | 4/2017 | Taneyhill | B60W 30/16 |
| 9,802,598 B2* | 10/2017 | Choi | B60W 10/11 |
| 2003/0040402 A1 | 2/2003 | Loeffler | |
| 2003/0154953 A1* | 8/2003 | Yasui | F02D 41/1479 |
| | | | 123/205 |
| 2004/0117105 A1 | 6/2004 | Harada et al. | |
| 2006/0173601 A1 | 8/2006 | Bassiere et al. | |
| 2007/0044456 A1 | 3/2007 | Upadhyay et al. | |
| 2007/0163244 A1 | 7/2007 | Federle | |
| 2008/0126044 A1* | 5/2008 | Degaki | F02D 41/1497 |
| | | | 703/8 |
| 2009/0118954 A1 | 5/2009 | Wu et al. | |
| 2010/0036586 A1 | 2/2010 | Gourves | |
| 2013/0060434 A1* | 3/2013 | Kiuchi | B60W 10/06 |
| | | | 701/56 |
| 2013/0152549 A1 | 6/2013 | Light-Holets | |
| 2015/0019042 A1* | 1/2015 | Poechmueller | B60W 50/0098 |
| | | | 701/1 |
| 2016/0084373 A1* | 3/2016 | Jeong | F16H 61/0202 |
| | | | 701/59 |
| 2017/0369076 A1* | 12/2017 | Goo | B60G 17/0195 |

FOREIGN PATENT DOCUMENTS

| | | |
|---|---|---|
| EP | 2003318 A1 | 12/2008 |
| EP | 2463504 | 6/2012 |
| GB | 2460397 A | 12/2009 |
| JP | H08-144872 | 6/1996 |
| JP | 2003013794 A | 1/2003 |
| JP | 2004263633 A | 9/2004 |
| JP | 2006170214 | 6/2006 |
| JP | 2008095617 | 4/2008 |
| JP | 2009161158 A | 7/2009 |
| JP | 2009293585 | 12/2009 |
| JP | 2011220310 | 11/2011 |
| WO | 2005001266 A1 | 1/2005 |

OTHER PUBLICATIONS

Combined Search and Evaluation Report under Section 17 and 18(3) for Application No. GB1312211.4 dated Jan. 20, 2014.
The Chinese Search Report for CN Application No. 201480039368.7, dated Mar. 30, 2017.

* cited by examiner

ADAPTIVE POWERTRAIN CONTROL FOR OPTIMIZED PERFORMANCE

TECHNICAL FIELD

The subject matter of this description generally relates to vehicle powertrain control. More particularly, but not exclusively, the subject matter of this description relates to adaptively controlling one or more operation parameters of a vehicle powertrain. Aspects of the subject matter of this description relate to a method, a system and a vehicle.

BACKGROUND

Modern vehicles include a variety of control systems. Typical systems are configured at the factory so that various operation parameters are set to desired values that are expected to result in vehicle performance according to a selected design. For example, some operation parameters have an effect on fuel economy and those are set in accordance with a design that results in a selected fuel economy. Other parameters are set to control vehicle emissions within limits set by regulatory authorities. There are known ways of designing vehicle systems to address various output or performance characteristics of a vehicle.

SUMMARY

Adaptive powertrain control according to an embodiment of this invention allows for realizing an enhanced or optimized performance of one or more vehicle features. For example, by monitoring vehicle performance, dynamic adjustments can be made to various vehicle operation parameters to enhance a feature of vehicle performance, such as fuel economy.

According to an embodiment, a method of controlling a vehicle powertrain includes monitoring vehicle performance and determining whether at least one of a plurality of vehicle performance features may be enhanced. A plurality of operation parameters that are associated with the powertrain are identified that have a relationship to the at least one performance feature. An adjustment is automatically made to at least one of the identified operation parameters to thereby enhance at least one aspect of the at least one performance feature.

An embodiment including one or more features of the method of the preceding paragraph includes determining an influence that each identified operation parameter has on the performance feature and prioritizing adjusting one of the identified operation parameters having a first influence over another identified operation parameter with a second, lower influence.

An embodiment including one or more features of the method of any of the preceding paragraphs includes automatically adjusting at least the operation parameter with the highest influence.

An embodiment including one or more features of the method of any of the preceding paragraphs includes determining whether a first adjustment to the operation parameter with the highest influence results in enhancing the performance feature a desired amount. If the enhancement to the performance feature is different than the desired amount an embodiment includes automatically making a second adjustment to the operating parameter with the highest influence or automatically adjusting at least one other of the identified operation parameters that is selected according to the prioritizing.

In an embodiment including one or more features of the method of any of the preceding paragraphs the automatically adjusting comprises implementing an adjustment to at least one of the operation parameters and determining whether the adjustment causes a desired enhancement to the performance feature.

An embodiment including one or more features of the method of any of the preceding paragraphs includes repeatedly implementing another, different adjustment to at least one of the operation parameters if a most recent adjustment does not cause the desired enhancement to the performance feature.

In an embodiment including one or more features of the method of any of the preceding paragraphs the relationship comprises a mathematical model that corresponds to how the operation parameters influence the performance feature; and the automatically adjusting at least one of the identified operation parameters comprises changing a value of the at least one of the operation parameters in the mathematical model until the performance feature value of the mathematical model corresponds to a desired enhancement of the performance feature.

An embodiment including one or more features of the method of any of the preceding paragraphs includes determining whether automatically adjusting the at least one of the identified operation parameters causes at least one of the performance features to be outside of a desired performance range; and at least one of (i) further adjusting at least one of the operation parameters to bring the at least one of the performance features back into the desired performance range, or (ii) adjusting another one of the operation parameters to bring the at least one of the performance features back into the desired performance range.

In an embodiment including one or more features of the method of any of the preceding paragraphs the performance feature comprises fuel economy.

According to an embodiment, a system includes a controller configured to (i) monitor vehicle performance, (ii) determine whether at least one of a plurality of vehicle performance features may be enhanced, (iii) identify a plurality of operation parameters that are associated with the powertrain and that have a relationship to the at least one performance feature, and (iv) automatically adjust at least one of the identified operation parameters to thereby enhance at least one aspect of the at least one performance feature.

In an embodiment including one or more features of the system of the preceding paragraph the controller is configured to determine an influence that each identified operation parameter has on the performance feature and prioritize adjusting one of the identified operation parameters having a first influence over another identified operation parameter with a second, lower influence.

In an embodiment including one or more features of the system of any of the preceding paragraphs the controller is configured to automatically adjust at least the operation parameter with the highest influence.

In an embodiment including one or more features of the system of any of the preceding paragraphs the controller is configured to determine whether a first adjustment to the operation parameter with the highest influence results in enhancing the performance feature a desired amount. If the enhancement to the performance feature is different than the desired amount, the controller is configured to automatically make a second adjustment to the operating parameter with the highest influence or automatically adjust at least one other of the identified operation parameters that is selected according to the prioritizing.

In an embodiment including one or more features of the system of any of the preceding paragraphs the controller is configured to automatically adjust the at least one of the identified operation parameters by implementing an adjustment to at least one of the operation parameters and determining whether the adjustment causes the desired enhancement to the performance feature.

In an embodiment including one or more features of the system of any of the preceding paragraphs the controller is configured to repeatedly implement another, different adjustment to at least one of the operation parameters until the adjustment causes the desired enhancement to the performance feature.

In an embodiment including one or more features of the system of any of the preceding paragraphs the relationship comprises a mathematical model that corresponds to how the operation parameters influence the performance feature; and the controller is configured to automatically adjust at least one of the identified operation parameters by changing a value of the at least one of the operation parameters in the mathematical model until the performance feature value of the mathematical model corresponds to a desired enhancement of the performance feature.

In an embodiment including one or more features of the system of any of the preceding paragraphs the controller is configured to (i) determine whether automatically adjusting the at least one of the identified operation parameters causes at least one of the performance features to be outside of a desired performance range; and (ii) further adjust at least one of the operation parameters to bring the at least one of the performance features back into the desired performance range, or adjust another one of the operation parameters to bring the at least one of the performance features back into the desired performance range.

In an embodiment including one or more features of the system of any of the preceding paragraphs the performance feature comprises fuel economy.

In an embodiment including one or more features of the system of any of the preceding paragraphs the performance feature comprises urea consumption.

According to an embodiment, a vehicle comprises one or more features of the system of any of the preceding paragraphs.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

One or more embodiments of the present invention will now be described, by way of example only, with reference to the accompanying drawings, which can be briefly described as follows.

DETAILED DESCRIPTION

Figure 1:
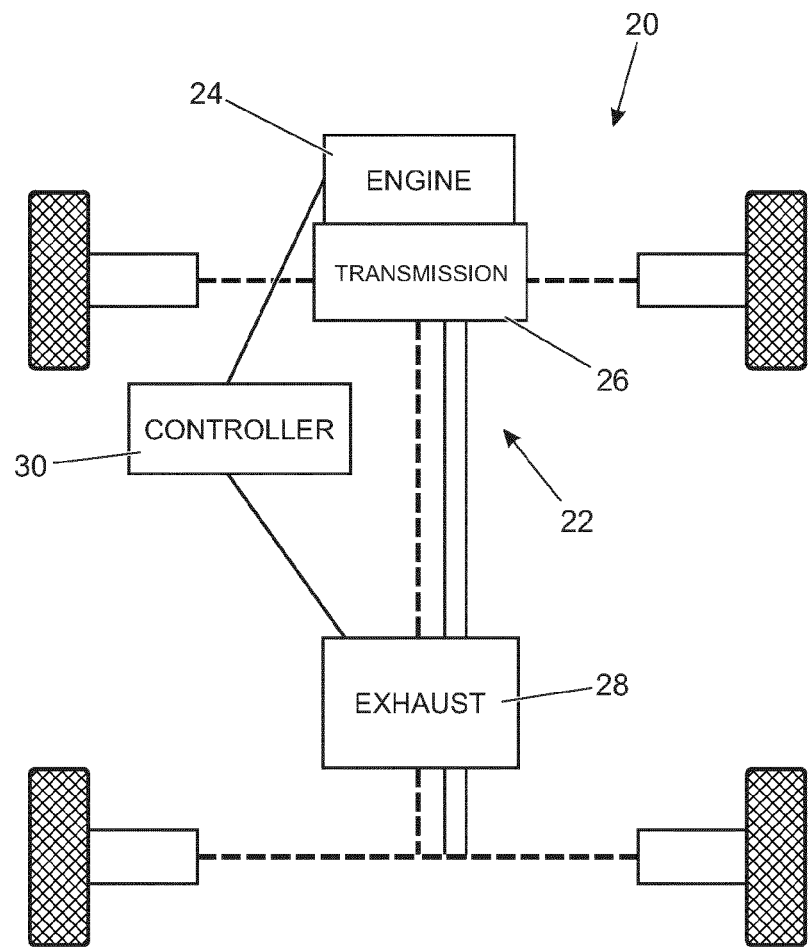
FIG. 1 diagrammatically illustrates selected portions of a vehicle designed according to an embodiment of this invention that includes a system for adaptively controlling the vehicle powertrain.

FIG. 1 schematically illustrates selected portions of a vehicle 20. A powertrain 22 of the vehicle includes various components, such as an engine 24, a transmission 26 and an exhaust 28. Each of the engine 24, transmission 26 and exhaust 28 includes at least one actuator or functional component, which is not illustrated for the sake of simplifying the illustration. Such components or actuators are known and those skilled in the art will understand how they are associated with the vehicle powertrain 22.

The vehicle is intended to perform in a manner that provides a desired level of performance and complies with ordinances or regulations that impose standards on various performance features of the vehicle. For example, the vehicle provides an expected fuel economy, which is one performance feature that is at least partially controllable based on settings of various operation parameters associated with the vehicle powertrain 22. Some performance features may be regulated and require performance within a particular range. For example, exhaust emissions from the vehicle and noise generated during vehicle operation should comply with relevant standards. The current operation condition and settings of the various actuators and functional components of the powertrain 22 have an impact on whether the performance features are within a desired or acceptable performance range.

The vehicle 20 includes a controller 30 that is configured to adaptively control operation of the powertrain 22 for achieving optimized performance. The controller 30 is configured to monitor vehicle operation and to adaptively control operation of the powertrain 22 in a manner that can enhance at least one of the vehicle performance features, such as fuel economy, while maintaining the performance features within a desired or acceptable performance range. In some cases the controller monitors vehicle performance based on driver tendencies. The controller 30 obtains information that allows the controller 30 to determine the status (e.g., operation condition or functionality and setting) of the various actuators or functional components of the powertrain 22. The controller 30 uses such information to automatically adjust at least one operation parameter that influences the performance features associated with powertrain operation.

Figure 2:
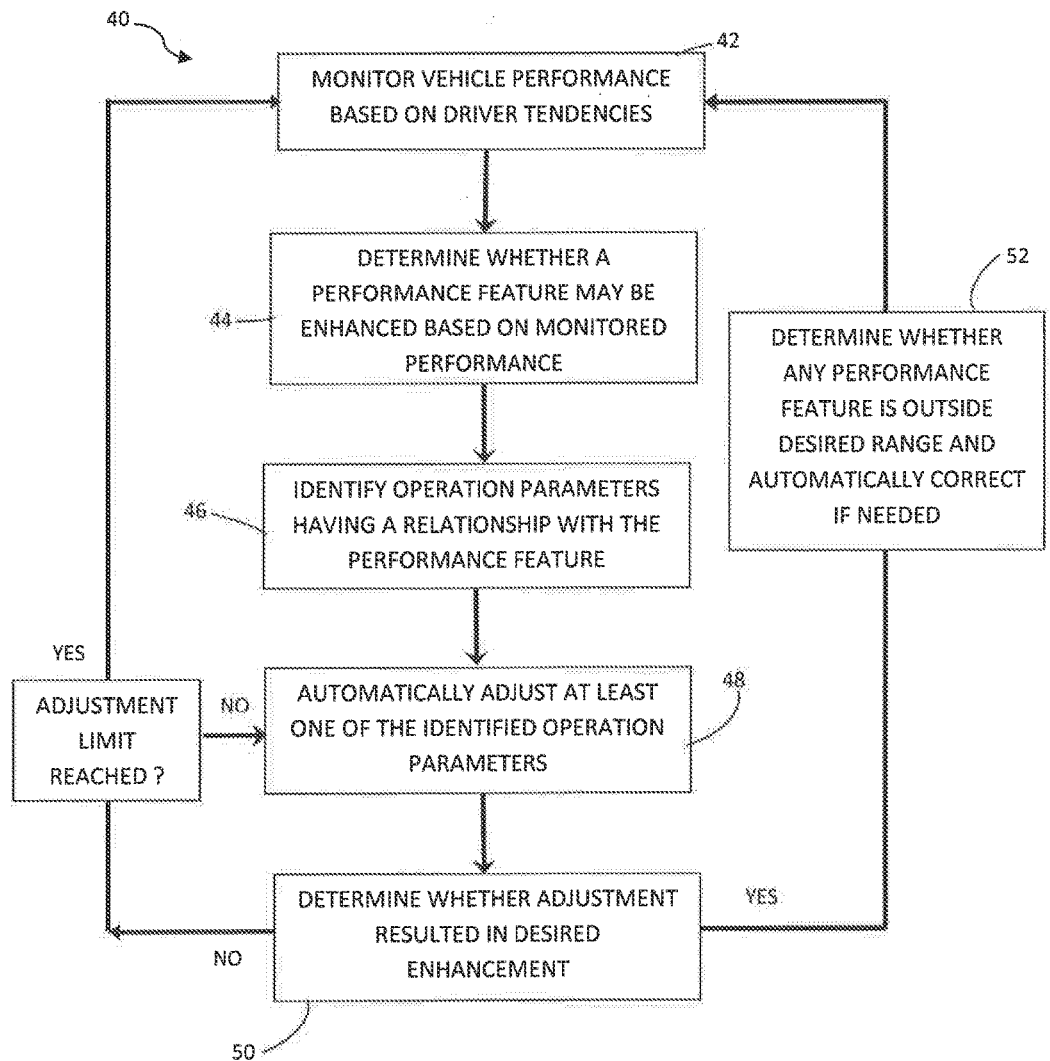
FIG. 2 is a flowchart diagram summarizing an example adaptive powertrain control strategy.

FIG. 2 includes a flow chart diagram 40 that summarizes an example method performed by the controller 30 for adaptively controlling the powertrain 22 to enhance or optimize a performance feature. For purposes of discussion fuel economy is considered as an example performance feature. At 42, the controller 30 monitors vehicle performance based on a driver's tendencies. Assuming that the vehicle is owned by one person who is the primary driver of the vehicle, there will be certain patterns of vehicle operation that can be determined by the controller 30 using information available from an engine control or transmission control module, for example. The manner in which the driver typically accelerates from a stop or the typical speeds at which the driver typically drives are example types of information that could be part of that which the controller takes into account at 42. A driver's tendencies can have an impact on whether a performance feature is at an optimum level.

At 44 the controller 30 determines whether any performance features might be enhanced based on the monitored performance. For example, it may be that better fuel economy could be realized. At 46 the controller 30 identifies operation parameters associated with the powertrain 22 that have a relationship with fuel economy. One example operation parameter that can influence fuel economy is the shift timing for shifting the gears of the transmission 26.

The controller 30 is configured to use a predetermined relationship between powertrain operation parameters and performance features to identify operation parameters that are candidates for an adjustment to attempt to provide an enhancement in the performance feature. In one example, the predetermined relationship is based upon or represented by a mathematical model that corresponds to the influence that each operation parameter has on each performance feature. In one particular example, the performance features are considered response surfaces and a known mathematical optimization tool is used to represent the influence of the operation parameters on the response surfaces. For example, known mathematical optimization tools and techniques are useful for finding the maximum or minimum values of multidimensional surfaces within imposed constraints. The controller 30 performs such an optimization in some embodiments for determining adjustments to one or more operation parameters to effect a change in a selected performance feature.

In another example, the relationship between a performance feature and operational parameters is determined based on empirical data. For example, some embodiments of the controller 30 will be configured with a data set corresponding to relationships among various performance features and various operation parameters. Those empirical-data-based relationships provide information to the controller for deciding which one or more of the operation parameters to adjust to attempt to enhance or optimize a performance feature.

Table 1 contains example performance features and operation parameters that would be useful in some embodiments. Table 1 is only a partial representation of the type of powertrain data that would be available to the controller for some vehicles.

Performance features are listed in the first column in Table 1, such as nitrogen oxides emissions (NOx), fuel economy (FUEL ECON), and selective catalytic reduction conversion efficiency (SCR EFF). Operation parameters are listed in the first row, such as high pressure exhaust gas recirculation (HP EGR), low pressure exhaust gas recirculation (LP EGR), charge temperature (CHARGE TEMP), variable valve timing (VARVALVE TIMING), urea dosing or consumption (UREA DOS/CON), fuel rail pressure (RAIL PRESSURE), and low pressure exhaust gas recirculation throttle (LP EGR THROTTLE).

In this example each of the operation parameters that has a relationship with the performance feature includes an indication in the corresponding row beneath that operation parameter. For example, the high pressure exhaust gas recirculation operation parameter has a relationship to the nitrogen oxides emissions and the fuel economy but not the selective catalytic reduction conversion efficiency. A cost function is used to evaluate an influence that each operation parameter has on each performance feature. A higher cost indicates a greater influence in some embodiments. In Table 1, an X indicates a relatively high influence and an E indicates a relatively low influence. An operation parameter with an X may impact the performance feature directly and an adjustment to such an operation parameter alone may make a significant change in the performance feature. An operation parameter with an E in Table 1 is considered an enabling parameter but would only impact the performance feature if that operation parameter were adjusted in combination with an adjustment to at least one other operation parameter.

The controller 30 in some embodiments is configured to determine a level of influence of each operation parameter and to prioritize adjustments based on the relative influences. The operation parameter with the highest influence is adjusted first in some examples when attempting to correct a particular performance feature.

At 48 the controller implements a change to at least one of the identified operation parameters, such as the shift timing. The shift timing of the transmission 26 (e.g., shift mapping of the points at which the controller requests a shift initiation dependent on torque demand and engine speed) initially will be set according to a design profile by the vehicle manufacturer. The controller 30 in this example changes the shift timing from at least one design set point to a different set point for at least one transition between gear ratios in an attempt to realize better fuel economy. For example, if the controller determines at 42 that a driver tends to accelerate aggressively the transmission shift points may be changed in a manner that will reduce the amount of fuel consumption during such acceleration.

After a chosen adjustment has been made the controller 30 determines whether the performance feature, such as fuel economy, has improved at 50. If not, further adjustments are made at 48. The further adjustments may be another adjustment to the same operation parameter or may be an adjustment to another operation parameter. In some cases it may not be possible to realize an enhancement and the controller 30 in this example includes a predetermined limit on the

TABLE 1

|  | HP EGR | LP EGR | CHARGE TEMP | VARVALVE TIMING | UREA DOS/CON | RAIL PRESSURE | LP EGR THROTTLE |
|---|---|---|---|---|---|---|---|
| NOx | X | X | X | X | X | E | E |
| FUEL ECON | X | X | X | X | E | X | E |
| SCR EFF |  |  |  |  |  | X |  | number of times that it will execute the loop between steps 48 and 50 with a negative determination at 50. If that limit is reached, the controller 30 returns to the step at 42.

In some examples, the controller determines a desired amount of enhancement and compares any enhancement to that desired amount when making the decision at 50. In other examples, any enhancement compared to a current value for the performance feature is considered beneficial enough to result in a positive determination at 50. In some cases, the determination at 50 will require some time to monitor the performance feature before any enhancement may be detected. The controller 30 in this example is suitably programmed to recognize appropriate criteria for determining whether a meaningful or useful enhancement has been realized.

If the determination at 50 reveals that the performance feature, such as fuel economy, has improved, the controller determines at 52 whether any performance feature has been negatively impacted by the adjustment to the operation parameter that was adjusted at 48. Some operation parameters have an effect on more than one performance feature and it is possible that adjusting one operation parameter for one purpose, such as to improve fuel economy might cause another performance feature to move outside of an acceptable range according to a regulation. If a performance feature is no longer acceptable, the controller 30 takes corrective action to keep as many vehicle performance features within regulated limits as possible.

One way in which the controller performs the step at 52 includes essentially the same strategies used in steps 44 and 46. The difference is that the controller at this stage is attempting to correct a performance feature that is outside of an acceptable range rather than attempting to improve on a performance feature that is already acceptable. In one example, the controller 30 begins corrective action by identifying a plurality of operation parameters that are associated with the actuators or functional components of the powertrain and have a relationship with the performance feature. The controller 30 automatically implements a change to at least one of the identified operation parameters to bring the performance feature closer to the acceptable or desired range while continuing to realize the enhancement achieved by performing steps 44-50.

In some instances a single adjustment to a single one of the identified operation parameters will rectify the situation and vehicle operation can continue based on the adaptive adjustment to the powertrain 22. For example, a slight reduction in the most recent operation parameter adjustment will suffice to bring the aberrant performance feature back in an acceptable range. In other situations, more than one of the identified operation parameters will be adjusted as part of an initial attempt to bring the aberrant performance feature back in line. There will be conditions, however, that require more than an initial or single adjustment to the selected operation parameter or combination of parameters to correct an unsatisfactory performance feature. After each attempted adjustment the controller 30 determines whether the adjustment has corrected the problem. If so, the procedure of FIG. 2 continues back to the step shown at 42 the example process is repeated.

In the event that the performance feature is still not at an acceptable level after an adjustment, the controller 30 attempts another adjustment by making a further adjustment to any operation parameters that have already been adjusted, making an adjustment to at least one other of the identified operation parameters, or a combination of these. This portion of the process may be repeated a number of times until a satisfactory result is achieved or a predetermined limit on automatic adjustments has been reached (e.g., a timer expires or a predetermined maximum number of possible adjustments).

In the event that the problem cannot be corrected using the adaptive powertrain control strategy, the adjustments made at 48 may be reversed to ensure that the vehicle is meeting regulatory requirements as a priority over experiencing the benefits of the just-achieved enhancement. It is better in most cases to ensure vehicle operation that is compliant with applicable regulations than to gain some benefit from an enhanced performance feature based on monitored vehicle performance.

Fuel economy was mentioned as an example performance feature that may be improved using the adaptive strategy of the example embodiment. Another way to utilize the example dynamic, adaptive adjustments is to control urea consumption. Consider a vehicle with a diesel engine and a urea tank for controlling exhaust emissions. There could be a situation in which the urea in the tank is getting low. The controller 30 may detect this as part of the monitored vehicle performance based on an appropriate sensor providing an indication of a low urea level. Using the adaptive control techniques of this description allows for delaying the time when the driver will need to have the urea tank refilled by reducing urea consumption.

If the rate of urea consumption were simply reduced alone, that could result in inadequate nitrogen oxides emission control. Adaptively controlling other operation parameters, however, could allow for a slower rate of urea consumption while staying within a necessary nitrogen oxides emission limit. The controller 30 may adjust at least one operation parameter that allows for less urea consumption without affecting the exhaust emissions that are controlled with urea usage.

For illustration purposes, consider a vehicle exhaust emissions fault that involves a level of discharge from the vehicle that exceeds a regulation on such emissions, which is caused by a reduced rate of urea consumption instigated by the controller based on detecting a low urea level. The controller 30 may determine that this condition exists using known sensor information that is indicative of the composition of the exhaust.

Figure 3:
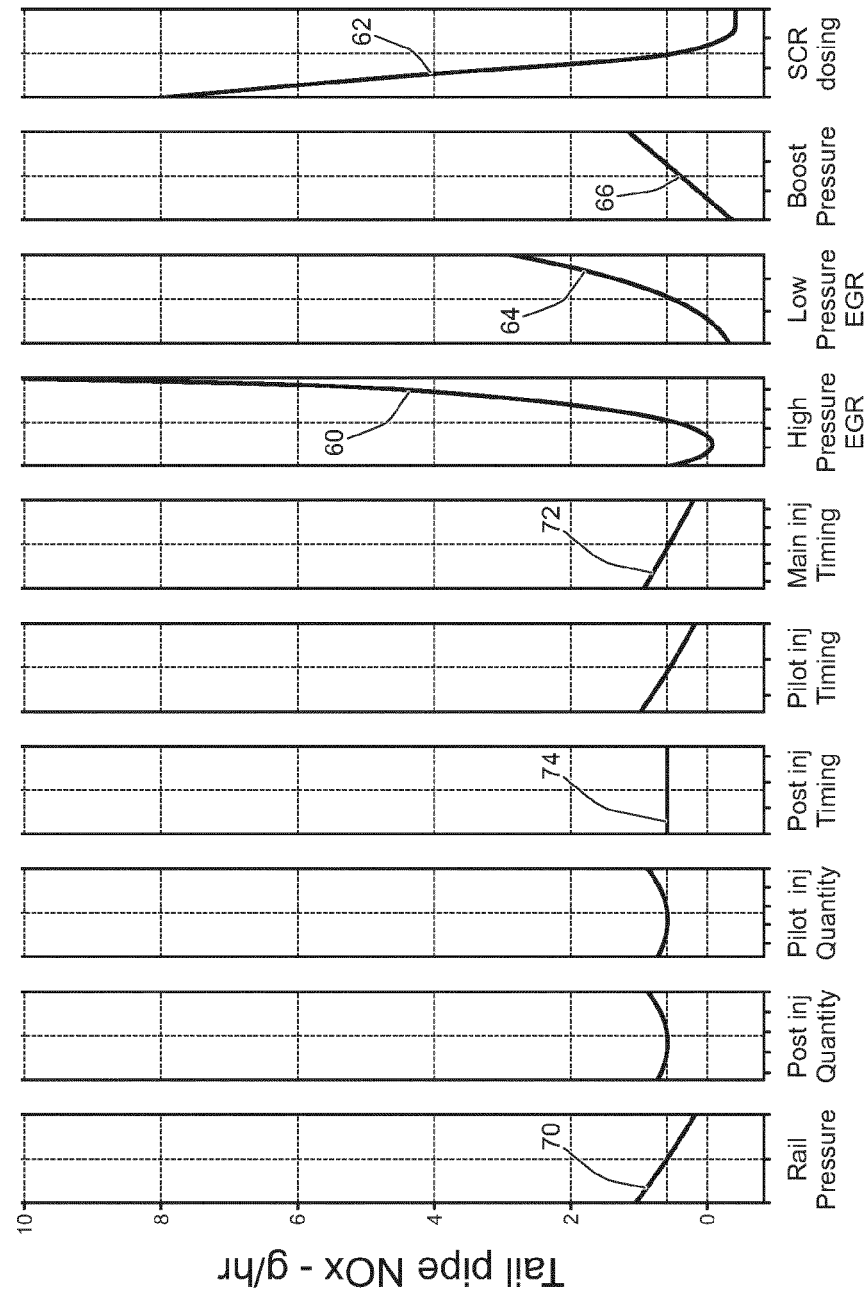
FIG. 3 graphically illustrates the respective influences a plurality of operation parameters may have on a vehicle performance feature, such as nitrogen oxides emissions.

FIG. 3 is a graphical representation of the relative effect of different operation parameters on the nitrogen oxides emissions performance feature. The more significant (i.e., higher) values shown in FIG. 3 correspond to a more significant influence. For example, the curve at 60 corresponds to the effect that High Pressure EGR has and the curve 62 corresponds to the effect of SCR dosing. In this example, those two operation parameters have the most significant effect followed by the Low Pressure EGR, which is represented by the curve 64, and the boost pressure, which is represented by the curve 66. The rail pressure and main injection timing operation parameters have a less significant effect as indicated by the lower values on the curves 70 and 72. The essentially flat curve 74 indicates that the post injection timing has essentially no effect on the nitrogen oxides performance feature.

The controller 30 may use a look up table containing information as represented in Table 1 above or FIG. 3, depending on the particular configuration and the manner in which data is provided to the controller 30. Those skilled in the art who have the benefit of this description will realize what data format will meet their particular needs.

Continuing with the example of an unacceptable nitrogen oxides emission level the controller 30 uses predetermined information like that shown in Table 1, FIG. 3, or both to identify the operation parameters that influence the nitrogen oxides emissions. The controller 30 implements an adjustment of at least one of the HP EGR, LP EGR, CHARGE TEMP, VARVALVE TIMING, and the RAIL PRESSURE based on the information in Table 1. If that adjustment corrects the problem then the vehicle may continue operating without violating the applicable emission standard while providing the advantage of a reduced urea consumption rate. If a first adjustment is not sufficient, the controller may adjust one or more of the operation parameters using a series of adjustments until a satisfactory nitrogen oxides level is realized.

Taking the data from FIG. 3 into account, the controller 30 in one example identifies the operation parameter that has the most significant effect on the nitrogen oxides emission performance feature and attempts an adjustment of at least that operation parameter. In the case of FIG. 3, the High Pressure EGR has a significant effect and the controller 30 may begin adjusting that operation parameter. Other operation parameters may also be adjusted to obtain the desired result as described above.

Figure 4:
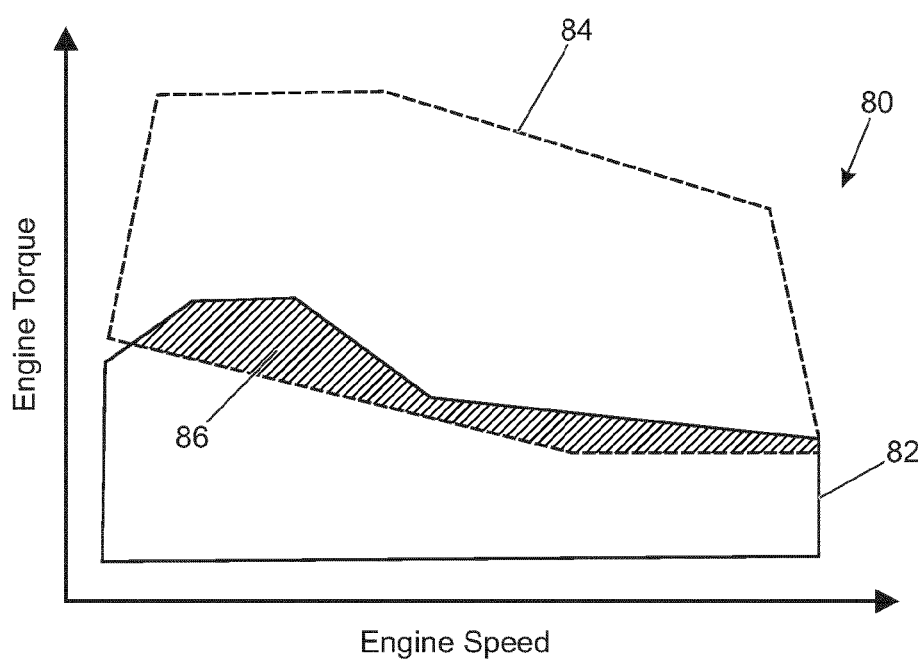
FIG. 4 graphically illustrates an aspect of selecting an operation parameter for adjustment for enhancing a performance feature.

In some examples, the controller 30 is programmed or provided with information so that the controller 30 may select between multiple possible operation parameters that could be adjusted, depending on the current vehicle operation conditions. FIG. 4 schematically shows how two different operation parameters may be a better first choice to effect a change in a given performance feature depending on the current vehicle operation conditions. The plot 80 in FIG. 4 represents a relationship between engine speed and engine torque. When values of engine speed and engine torque are within a first region 82, it would be more effective to adjust the High Pressure EGR. When the operating conditions are within a second region 84, it would be more effective to adjust the Low Pressure EGR. In some cases, such as that shown in FIG. 4, there is an overlap region shown at 86 where either of the operation parameters may be adjusted to bring an aberrant performance feature in line with a desired or acceptable range. The controller 30 in some examples uses information such as that shown in FIG. 4 for determining which operation parameter to adjust in a particular situation.

Figure 5:
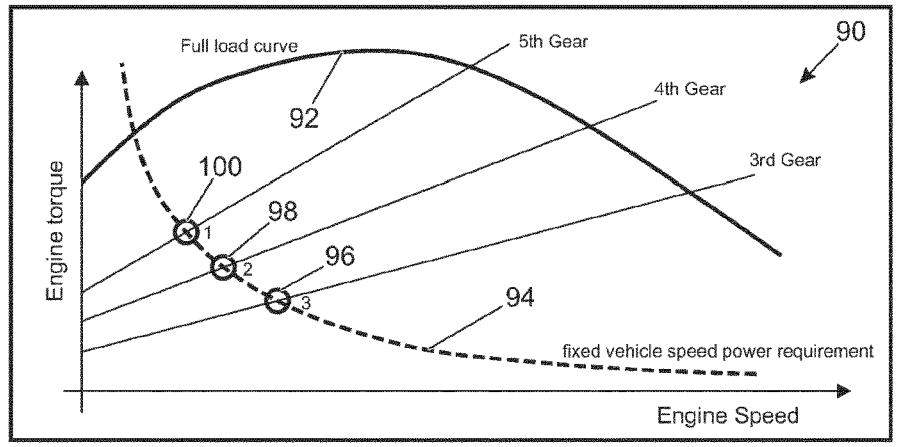
FIG. 5 graphically illustrates an aspect of adjusting a transmission shift schedule operation parameter for enhancing a performance feature in a first type of vehicle.

FIG. 5 includes a plot of an example relationship between engine torque and engine speed. A curve 92 represents a full load curve and a curve 94 represents a vehicle speed power requirement, such as a 5 kW power requirement for a vehicle speed of 50 kph, which can be considered a fixed power demand for cruise conditions. The vehicle engine can develop that power at a number of speed load conditions, which are dictated by the gear ratios of the transmission. The circles at 96, 98 and 100 represent where the desired power might be achieved in each of third, fourth and fifth gears, respectively. If fuel efficiency is a performance feature of interest, it may be useful to choose the highest gear for a given speed load condition to enable the lowest engine speed and lowest associated frictional losses to achieve the highest fuel efficiency. Another effect of changing the engine operating point, however, is that the strength of the control parameter relationships on pollutants change, such as a change in the relationships between gradients of the NOx and operation parameters. One example embodiment includes choosing one of the three presented optimization opportunities by determining the best compromise at one of the circles 96, 98, or 100. This demonstrates how selecting the gear for a particular operating condition may impact performance features other than one of primary concern (at that particular instance).

Figure 6:
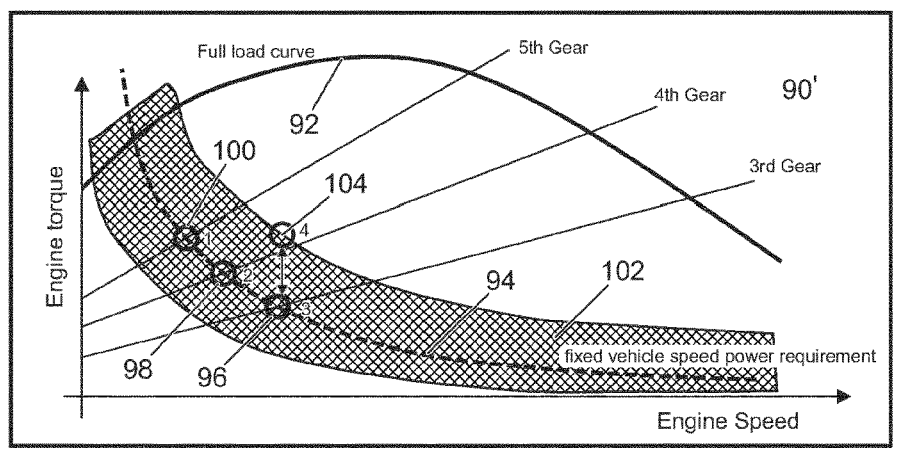
FIG. 6 graphically illustrates an aspect of adjusting a transmission shift schedule operation parameter for enhancing a performance feature in a second type of vehicle.

FIG. 6 shows a plot 90' that resembles the plot 90 of FIG. 5 to illustrate further opportunities to select different operation parameters to realize a different or enhanced performance feature. In this example, the range schematically shown at 102 indicates how different loads may be imposed on the internal combustion engine in a hybrid vehicle compared to the possibilities presented with a non-hybrid vehicle. The presence of the electric motor(s) of the hybrid vehicle widens the range of possibilities from the line at 94 to the range at 102.

For example, the electric motor(s) of the hybrid vehicle may provide additional power to achieve the desired power needed for the current driving conditions. The circle 104 shows a possible set of operation parameters that provides the same power output with the electric motor contributing toward the total as the output power provided at 96 when the combustion engine is the sole source of power. In hybrid vehicle embodiments, the controller may select various engine operation parameters, which introduces additional trade-off relationships for a condition in which an overall powertrain objective is achievable.

Figure 7:
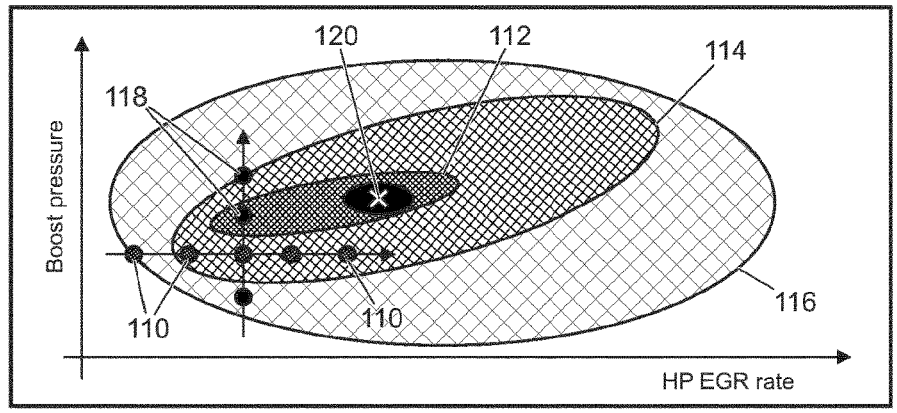
FIG. 7 graphically illustrates an aspect of adjusting a plurality of operation parameters for enhancing a performance feature of a vehicle.

FIG. 7 schematically represents a relationship between a vehicle response versus engine boost pressure and HP EGR rate. If the HP EGR rate is the operation parameter that has the most significant effect on the performance feature of interest then the controller may select one of the options represented by the HP EGR operation parameter values at 110. Changing the HP EGR value (e.g., moving from left to right in the illustration) results in an improved response signified by the different iso response surfaces 112, 114 and 116, which are schematically shown in the background. Eventually the iso response plateaus or even worsens. The controller in this example optimizes the conditions by reverting back to a more favorable HP EGR value.

Further adjustments may be made, such as changing the boost pressure to the values shown at 118. The values shown at 120 may be the optimum result. The controller is programmed in some examples to use a global optimization approach that searches the response surface for the optimum result rather than adjusting one operation parameter at a time and in a linear, sequential order. In some situations adjusting a single operation parameter may provide the optimum result so the global optimum search approach may include adjusting a single operation parameter under some circumstances.

In the preceding description some example actuators or functional components are mentioned for discussion purposes. Those skilled in the art will realize how other actuators would be relevant to a consideration of a circumstance that is different than those described above and how the disclosed adaptive control techniques will be useful to address other situations in which adjusting one or more performance features would be desirable.

While various features and aspects are described above in connection with one or more particular embodiments, those features and aspects are not necessarily exclusive to the corresponding embodiment. The disclosed features and aspects may be combined in other ways than those specifically mentioned above. In other words, any feature of one embodiment may be included with or substituted for a feature of another embodiment.

Non-limiting aspects of one or more embodiments of the invention will also be understood with reference to the following numbered paragraphs:

1. A method of controlling a vehicle powertrain, comprising the steps of:
   monitoring vehicle performance;
   determining whether at least one of a plurality of vehicle performance features may be enhanced;
   identifying a plurality of operation parameters that are associated with the powertrain and that have a relationship to the at least one performance feature; and
   automatically adjusting at least one of the identified operation parameters to thereby enhance at least one aspect of the at least one performance feature.

2. The method of paragraph 1, comprising
   determining an influence that each identified operation parameter has on the performance feature; and
   prioritizing adjusting one of the identified operation parameters having a first influence over another identified operation parameter with a second, lower influence.

3. The method of paragraph 2, comprising
   automatically adjusting at least the operation parameter with the highest influence.

4. The method of paragraph 3, comprising
   determining whether a first adjustment to the operation parameter with the highest influence results in enhancing the performance feature a desired amount; and
   automatically making a second adjustment to the operating parameter with the highest influence if the enhancement to the performance feature is different than the desired amount; or
   automatically adjusting at least one other of the identified operation parameters that is selected according to the prioritizing if the enhancement to the performance feature is different than the desired amount.

5. The method of paragraph 1, wherein the automatically adjusting comprises
   implementing an adjustment to at least one of the operation parameters; and
   determining whether the adjustment causes a desired enhancement to the performance feature.

6. The method of paragraph 5, comprising
   repeatedly implementing another, different adjustment to at least one of the operation parameters if a most recent adjustment does not cause the desired enhancement to the performance feature.

7. The method of paragraph 1, wherein
   the relationship comprises a mathematical model that corresponds to how the operation parameters influence the performance feature; and
   the automatically adjusting at least one of the identified operation parameters comprises changing a value of the at least one of the operation parameters in the mathematical model until the performance feature value of the mathematical model corresponds to a desired enhancement of the performance feature.

8. The method of paragraph 1, comprising
   determining whether automatically adjusting the at least one of the identified operation parameters causes at least one of the performance features to be outside of a desired performance range; and
   at least one of
   further adjusting at least one of the operation parameters to bring the at least one of the performance features back into the desired performance range, or
   adjusting another one of the operation parameters to bring the at least one of the performance features back into the desired performance range.

9. The method of paragraph 1, wherein the performance feature comprises fuel economy.

10. A system, comprising:
    a controller configured to
    monitor vehicle performance;
    determine whether at least one of a plurality of vehicle performance features may be enhanced;
    identify a plurality of operation parameters that are associated with the powertrain and that have a relationship to the at least one performance feature; and
    automatically adjust at least one of the identified operation parameters to thereby enhance at least one aspect of the at least one performance feature.

11. The system of paragraph 11, wherein the controller is configured to
    determine an influence that each identified operation parameter has on the performance feature; and
    prioritize adjusting one of the identified operation parameters having a first influence over another identified operation parameter with a second, lower influence.

12. The system of paragraph 11, wherein the controller is configured to
    automatically adjust at least the operation parameter with the highest influence.

13. The system of paragraph 12, wherein the controller is configured to
    determine whether a first adjustment to the operation parameter with the highest influence results in enhancing the performance feature a desired amount; and
    automatically make a second adjustment to the operating parameter with the highest influence if the enhancement to the performance feature is different than the desired amount; or
    automatically adjust at least one other of the identified operation parameters that is selected according to the prioritizing if the enhancement to the performance feature is different than the desired amount.

14. The system of paragraph 10, wherein the controller is configured to automatically adjust the at least one of the identified operation parameters by
    implementing an adjustment to at least one of the operation parameters; and
    determining whether the adjustment causes the desired enhancement to the performance feature.

15. The system of paragraph 14, wherein the controller is configured to
    repeatedly implement another, different adjustment to at least one of the operation parameters until the adjustment causes the desired enhancement to the performance feature.

16. The system of paragraph 10, wherein
    the relationship comprises a mathematical model that corresponds to how the operation parameters influence the performance feature; and
    the controller is configured to automatically adjust at least one of the identified operation parameters by changing a value of the at least one of the operation parameters in the mathematical model until the performance feature value of the mathematical model corresponds to a desired enhancement of the performance feature.

17. The system of paragraph 10, wherein the controller is configured to
    determine whether automatically adjusting the at least one of the identified operation parameters causes at least one of the performance features to be outside of a desired performance range; and
    at least one of further adjust at least one of the operation parameters to bring the at least one of the performance features back into the desired performance range, or adjust another one of the operation parameters to bring the at least one of the performance features back into the desired performance range.

18. The system of paragraph 10, wherein the performance feature comprises fuel economy.

19. The system of paragraph 10, wherein the performance feature comprises urea consumption.

20. A vehicle comprising the system of paragraph 10.

The preceding description is illustrative rather than limiting in nature. Variations and modifications to the disclosed examples may become apparent to those skilled in the art that do not necessarily depart from the essence of the contribution to the art provided by the disclosed examples. The scope of legal protection provided to the invention can only be determined by studying the following claims.

We claim:

1. A method of controlling a vehicle powertrain, comprising the steps of:

monitoring vehicle performance to determine patterns of at least one of vehicle acceleration and speed associated with a driver of the vehicle;

determining from a measurement by a sensor of at least one of a plurality of vehicle performance features whether at least one of the plurality of vehicle performance features that are inside a desired performance range associated with the at least one vehicle performance features may be improved based upon the determined patterns of at least one of vehicle acceleration and speed;

identifying a plurality of operation parameters that are associated with the powertrain and that have a relationship to the at least one performance feature;

automatically adjusting at least one of the identified operation parameters to thereby improve at least one aspect of the at least one performance feature;

determining an influence that each identified operation parameter has on the at least one performance feature; and prioritizing adjusting one of the identified operation parameters having a first influence over another identified operation parameter with a second, lower influence.

2. The method of claim 1, comprising automatically adjusting at least the operation parameter with the highest influence.

3. The method of claim 2, comprising determining whether a first adjustment to the operation parameter with the highest influence results in improving the at least one performance feature a desired amount; and automatically making a second adjustment to the operation parameter with the highest influence if the improvement to the at least one performance feature is different than the desired amount; or automatically adjusting at least one other of the identified operation parameters that is selected according to the prioritizing if the improvement to the at least one performance feature is different than the desired amount.

4. The method of claim 1, wherein the automatically adjusting comprises implementing an adjustment to at least one of the operation parameters; and determining whether the adjustment causes a desired improvement to the at least one performance feature.

5. The method of claim 4, comprising repeatedly implementing another, different adjustment to at least one of the operation parameters if a most recent adjustment does not cause the desired improvement to the at least one performance feature.

6. The method of claim 1, wherein the relationship comprises a mathematical model that corresponds to how the operation parameters influence the at least one performance feature; and the automatically adjusting at least one of the identified operation parameters comprises changing a value of the at least one of the operation parameters in the mathematical model until a performance feature value of the mathematical model corresponds to a desired improvement of the at least one performance feature.

7. The method of claim 1, comprising determining whether automatically adjusting the at least one of the identified operation parameters causes at least one of the performance features to be outside of a desired performance range; and at least one of further adjusting at least one of the operation parameters to bring the at least one of the performance features back into the desired performance range, or adjusting another one of the operation parameters to bring the at least one of the performance features back into the desired performance range.

8. The method of claim 1, wherein the at least one performance feature comprises fuel economy.

9. A system for controlling a powertrain, comprising:

a controller configured to monitor vehicle performance to determine patterns of at least one of vehicle acceleration and speed associated with a driver of the vehicle;

determine from a measurement by a sensor of at least one of a plurality of vehicle performance features whether at least one of the plurality of vehicle performance features that are inside a desired performance range associated with the at least one vehicle performance feature may be improved based upon the determined patterns of at least one of vehicle acceleration and speed;

identify a plurality of operation parameters that are associated with a powertrain and that have a relationship to the at least one performance feature;

automatically adjust at least one of the identified operation parameters to thereby improve at least one aspect of the at least one performance feature;

determine an influence that each identified operation parameter has on the at least one performance feature; and prioritize adjusting one of the identified operation parameters having a first influence over another identified operation parameter with a second, lower influence.

10. The system of claim 9, wherein the controller is configured to automatically adjust at least the operation parameter with the highest influence.

11. The system of claim 10, wherein the controller is configured to determine whether a first adjustment to the operation parameter with the highest influence results in improving the at least one performance feature a desired amount; and automatically make a second adjustment to the operation parameter with the highest influence if the improvement to the at least one performance feature is different than the desired amount; or automatically adjust at least one other of the identified operation parameters that is selected according to the prioritizing if the improvement to the at least one performance feature is different than the desired amount.

12. The system of claim 9, wherein the controller is configured to automatically adjust the at least one of the identified operation parameters by implementing an adjustment to at least one of the operation parameters; and determining whether the adjustment causes the desired improvement to the at least one performance feature.

13. The system of claim 12, wherein the controller is configured to repeatedly implement another, different adjustment to at least one of the operation parameters until the adjustment causes the desired improvement to the at least one performance feature.

14. The system of claim 9, wherein the relationship comprises a mathematical model that corresponds to how the operation parameters influence the at least one performance feature; and the controller is configured to automatically adjust at least one of the identified operation parameters by changing a value of the at least one of the operation parameters in the mathematical model until a performance feature value of the mathematical model corresponds to a desired improvement of the at least one performance feature.

15. The system of claim 9, wherein the controller is configured to determine whether automatically adjusting the at least one of the identified operation parameters causes at least one of the performance features to be outside of a desired performance range; and at least one of further adjust at least one of the operation parameters to bring the at least one of the performance features back into the desired performance range, or adjust another one of the operation parameters to bring the at least one of the performance features back into the desired performance range.

16. The system of claim 9, wherein the at least one performance feature comprises fuel economy.

17. The system of claim 9, wherein the at least one performance feature comprises urea consumption.

18. A vehicle comprising the system of claim 9.

19. The system of claim 9, wherein the controller is configured to automatically adjusting the at least one of the identified operation parameters by adjusting the shift timing of a transmission for at least one transition between gear ratios.

20. The system of claim 15, wherein the controller is configured to use a predetermined limit on the number of automatic adjustments to further adjust the at least one of the operation parameters or adjust the another one of the operation parameters; and reverse the automatic adjustments, such that each of the plurality of vehicle performance features are inside the desired performance range, when the predetermined limit is reached.

21. A system, comprising:

a controller configured to monitor vehicle performance;

determine from a measurement by a sensor of at least one of a plurality of vehicle performance features whether at least one of the plurality of vehicle performance features that are inside a desired performance range associated with the at least one vehicle performance feature may be improved;

identify a plurality of operation parameters that are associated with a powertrain and that have a relationship to the at least one performance feature;

automatically adjust at least one of the identified operation parameters to thereby improve at least one aspect of the at least one performance feature;

determine an influence that each identified operation parameter has on the at least one performance feature; and prioritize adjusting one of the identified operation parameters having a first influence over another identified operation parameter with a second, lower influence;

determine whether automatically adjusting the at least one of the identified operation parameters causes at least one of the performance features to be outside of a desired performance range; and at least one of further adjust at least one of the operation parameters to bring the at least one of the performance features back into the desired performance range, or adjust another one of the operation parameters to bring the at least one of the performance features back into the desired performance range;

use a predetermined limit on the number of automatic adjustments to further adjust the at least one of the operation parameters or adjust the another one of the operation parameters; and reverse the automatic adjustments, such that each of the plurality of vehicle performance features are inside the desired performance range, when the predetermined limit is reached.

\* \* \* \* \*

UNITED STATES PATENT AND TRADEMARK OFFICE
CERTIFICATE OF CORRECTION

PATENT NO. : 10,053,103 B2  
APPLICATION NO. : 14/903315  
DATED : August 21, 2018  
INVENTOR(S) : Neil Bevan et al.

It is certified that error appears in the above-identified patent and that said Letters Patent is hereby corrected as shown below:

In the Claims

In Claim 1, Column 13, Line 31; replace "features" with --feature--

In Claim 9, Column 14, Line 36; replace "the vehicle" with --a vehicle--

In Claim 19, Column 15, Line 50; replace "adjusting" with --adjust--

In Claim 21, Column 16, Line 33; replace "causes at least" with --causes the at least--

In Claim 21, Column 16, Line 34-35; replace "of a desired performance range" with --of the desired performance range--

Signed and Sealed this  
First Day of February, 2022

Drew Hirshfeld  
*Performing the Functions and Duties of the  
Under Secretary of Commerce for Intellectual Property and  
Director of the United States Patent and Trademark Office*